United States Patent [19]
Brockwell

[11] Patent Number: 5,324,529
[45] Date of Patent: Jun. 28, 1994

[54] PROCESS OF AND APPARATUS FOR HANDLING GREEN CHEESE

[76] Inventor: Ian P. Brockwell, 6228 Parkwood Rd., Edina, Minn. 55436

[21] Appl. No.: 880,910

[22] Filed: May 8, 1992

[51] Int. Cl.⁵ .................... A01J 25/00; A23C 19/06; B65B 25/06
[52] U.S. Cl. .................... 426/392; 53/435; 53/518; 83/23; 83/39; 83/697; 99/456; 425/217; 425/307; 425/308; 426/414; 426/491; 426/495; 426/512; 426/518; 426/582
[58] Field of Search ............... 426/392, 410, 414, 512, 426/518, 582, 491, 495; 425/215, 217, 306, 307, 308; 53/427, 432, 435, 510, 518; 83/23, 39, 697; 99/456

[56] References Cited

U.S. PATENT DOCUMENTS

| | | | |
|---|---|---|---|
| 4,152,101 | 5/1979 | Charles | 425/85 |
| 4,309,941 | 1/1982 | Brockwell | 99/453 |
| 4,610,885 | 9/1986 | Tait | 426/414 X |

*Primary Examiner*—Leo B. Tentoni
*Attorney, Agent, or Firm*—Palmatier, Sjoquist & Helget

[57] ABSTRACT

A system for handling of cheese in the green state particularly directed for handling natural cheese types such as cheddar and colby in a manner so that they can be conveniently sub-divided and individually packaged, on the same day of manufacturing, into a variety of finished consumer and cheese market sized portions. The system includes the handling of green cheese immediately as it is formed through the processes of batch or continuous cheese making equipment and cheese towers to provide, preferably, 40 to 45 or other selected pound blocks of green cheese. The cheese blocks are immediately handled after forming to eliminate the normally utilized bulk block aging or curing systems. The green cheese blocks are selectively handled and may be placed into temporary bulk block pouches and packaged for future handling or are directed to trimming and cutting devices which will trim and cut the blocks into the consumer, market size units. The aspect of green cheese handling allows immediate recycling of the green cheese material should it, for any reason, not meet consumer, market quality conditions. The entire handling operation and recycling operation insures that the cheese is handled in the green state.

44 Claims, 7 Drawing Sheets

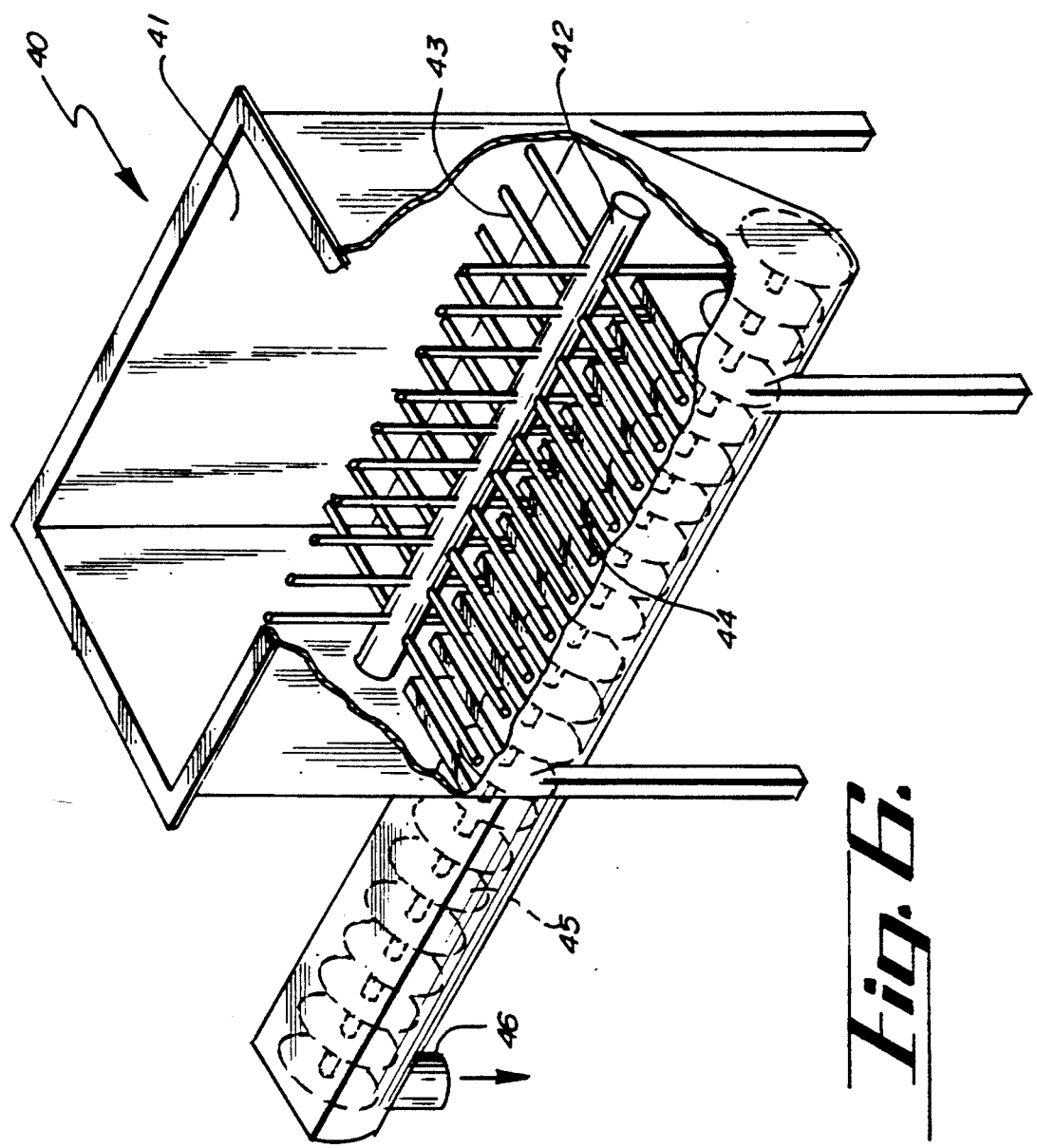

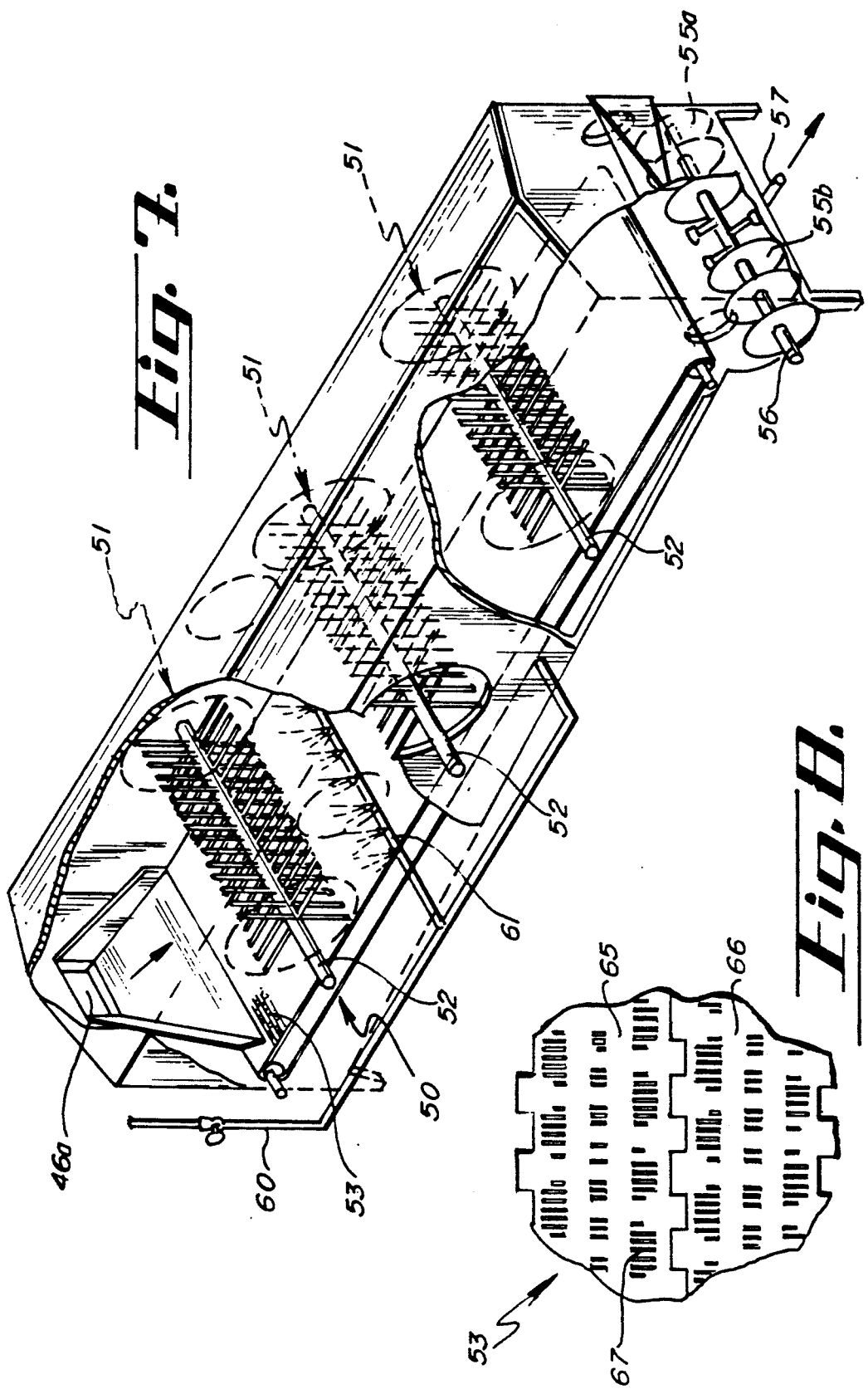

PROCESS OF AND APPARATUS FOR HANDLING GREEN CHEESE

RELATED APPLICATIONS

There are no applications in the United States Patent Office currently on file by the inventor which would be pertinent to the prosecution of this application.

FEDERAL SPONSORSHIP

This invention has not been made under any federally sponsored research and development arrangement nor under any other research and development program.

FIELD OF THE INVENTION

The present invention concerns the handling of natural cheeses while they are in a green state including the manufacture, trimming and packaging of consumer and market sized portions including the recycling thereof, while the cheese is in the green state. The handling system includes cutting, packaging, metal detection, weighing, pre-cooling, scale/printing, labeling and curing as desired. The handling system also includes bulk block packaging including the steps of metal detection, scaling, temporary packaging, cooling and handling of the bulk blocks.

SUMMARY OF THE INVENTION

The system for the handling of natural American cheese types which preferably includes continuous cheese making machinery, block forming cheese towers, block inspection and selection to determine routing of blocks to bulk block or consumer sized portion handling, in following the rapid handling route of cutting and pre-sizing of the green cheese, a pre-squaring trimmer may be utilized to bring the formed block into a generally rectangular shape with continued handling to sub-divide the so selected block into consumer sized portions. For blocks which are directed to the cutting system, the system also includes possible steps of re-crumbling, re-conditioning and recycling while in the green state should the block itself or the cut portions not meet certain standards.

The handling system provided herein is directed to the handling of cheese while it is in the green state and therefore will normally be accomplished within a very short period of time, such as a one day production period. Aging, curing and ripening of the green cheese is developed after the pre-sizing and packaging to desired consumer and market size.

BACKGROUND AND OBJECTS OF THE INVENTION

In the United States, natural American cheese types such as cheddar and colby are prepared by coagulating ripened milk of proper Ph with rennet, cutting the coagulant and cooking the curd and whey mixture after which the whey is drained from the curd and the curd is subjected to a variety of treatments after which salt is mixed with the curd granuals or milled pieces. These processes are well known in the art.

In such bulk or continuous methods, the fresh, warm, mellow curd particulates are compressed to remove residual whey and result in curd formation. The cheese tower is well known in the art and the tower causes the curd particulates to become fused and shaped into a single, compacted, green cheese block, standardly rectangular in shape with unit weight of between 40 to 45 pounds or in the case of an average large block, a weight of 640 to 700 pounds. Circular units of 500 pounds are also provided. These methods are well known in the art.

It is common, in traditional processes, to direct these formed bulk blocks into curing aging and ripening areas wherein they may be stored for periods of 15 to 90 days. After such curing, the now cool, firm blocks are removed from their temporary bulk packages, then subdivided to consumer or cheese market size portions which may range from 8 ounce to, for example, 5 and 6 pound unit sizes. When dealing with cheese that has been prepared in bulk blocks, aged, understandably firmed and thereafter trimmed and cut into consumer cheese market size packages, it should be obvious that a dual handling of the cheese is required. Also, when utilizing these traditional methods, the trimming and cutting results in losses which obviously result in per unit price increases. With the applicant's concept of handling the cheese in its green state and bringing it rapidly or immediately, same day of manufacture, to final packaged portions, such dual handling is eliminated, the need for bulk storing facilities is eliminated and the losses of trimming and sizing are substantially reduced.

It is therefore an object of the applicant's invention to provide a system for handling natural American cheeses while they are in the green state which includes the processes of trimming and cutting into consumer or cheese market size portions and immediately packaging the same which will eliminate dual handling of the cheese as occurs with conventional cheeses that are partially or totally cured and thereafter so divided.

It is a further object of the applicant's invention to provide a system for the handling of natural American cheeses such as colby and cheddar while the same is in its green state to allow selection thereof for conventional bulk packaging or direct consumer or cheese market size packaging.

It is still a further object of the applicant's invention to provide a system for handling green cheese including the formation of 40 to 45 pound blocks or blocks of more suitable size of green cheese, trimming and sub-dividing the green cheese into selectable consumer or cheese market size, packaging these portions and thereafter providing the same ready for distribution to the consumer, the curing, aging or ripening process continuing after packaging while the cheese is in its final protective vacuum package to eliminate any possible invasion of foreign elements to the cheese.

It is still a further object of the applicant's invention to provide a system for handling of green cheese which allows inspection as the same exits from a cheese tower and crumbling and reconditioning if it does not meet certain conditions so the cheese may be immediately recycled while in the green state.

It is still a further object of the applicant's invention to provide a handling system for natural American cheeses such as cheddar and colby cheeses wherein dual handling of the cheese and temporary bulk packaging materials are eliminated.

These and other objects and advantages of the applicant's invention will more fully appear from a consideration of the accompanying drawings and description.

SHORT DESCRIPTION OF THE DRAWINGS

FIG. 6 is a perspective view of a re-crumbler utilized for crumbling blocks of green cheese portions or complete blocks which may not meet the standards for portion cutting nor meet standards for bulk block storage;

FIG. 7 is a perspective view of a conditioner for re-conditioning of green cheese that has been re-crumbled prior to recycling thereof in a cheese tower; and, FIG. 8 illustrates a section of the carrying conveyor as utilized in the conditioner unit of FIG. 7.

DESCRIPTION OF A PREFERRED FORM OF THE INVENTION

Figure 1:
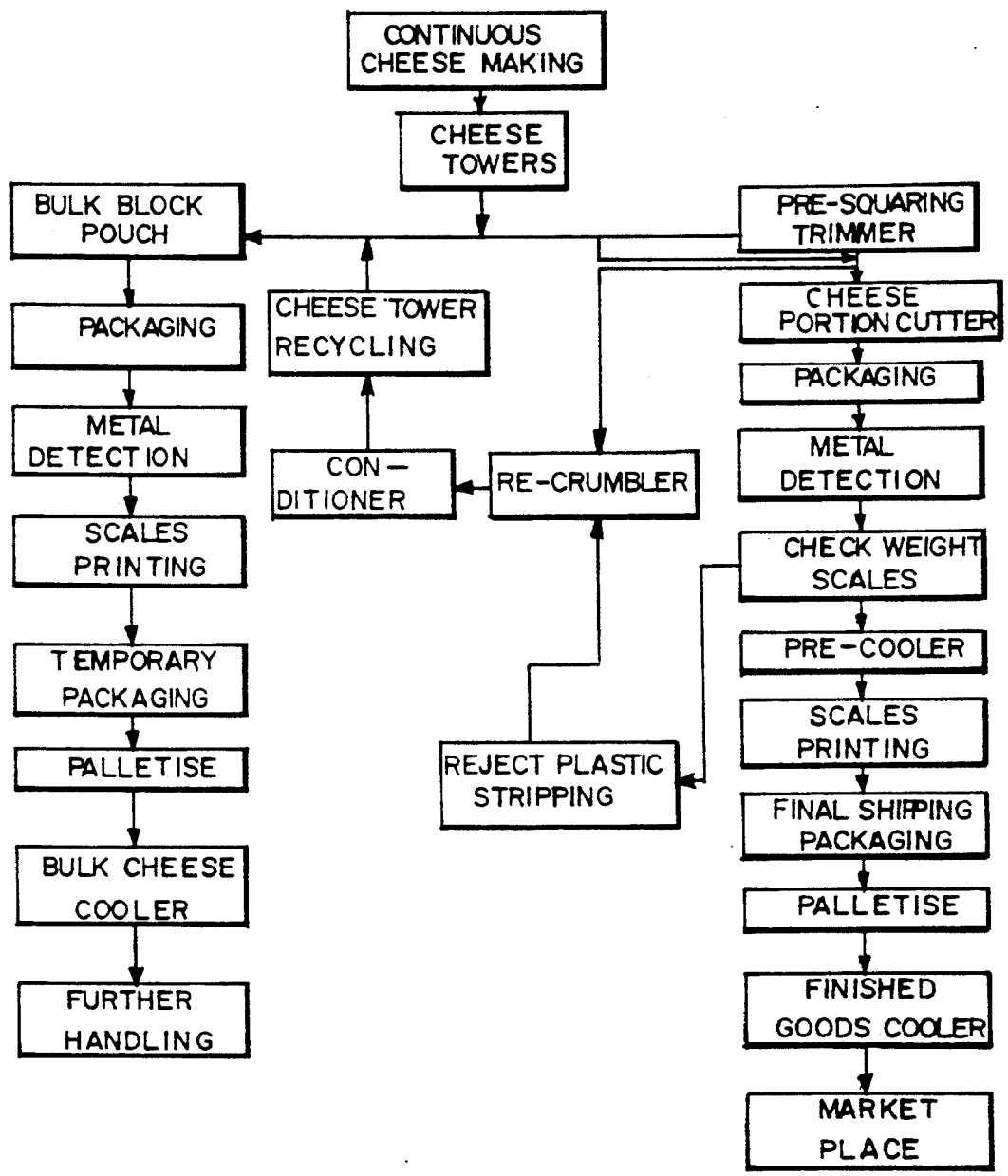
FIG. 1 is a schematic flow diagram which illustrates the applicant's system for the handling of cheese while it is in its green state and bringing the cheese from the continuous cheese making process through systems of cutting and apportioning and final packaging thereof into consumer size units, or the handling of bulk blocks.

The primary aspect of the system for handling green cheese regarding applicant's invention is best illustrated in the flow chart of FIG. 1. The remaining views illustrate various primary components in the handling process.

As illustrated in FIG. 1 the process of green cheese handling begins, preferably, with a continuous cheese making system which is illustrated by the U.S. Pat. No. 4,309,941, issued to the applicant hereof, Ian P. Brockwell, entitled CHEESE MAKING METHOD AND APPARATUS which issued Jan. 12, 1982. From this continuous cheese making device the cheese curds and whey are introduced into a cheese tower which is best exemplified by U.S. Pat. No. to Charles, No. 4,152,101, issued May 1, 1979. This cheese tower is illustrated in schematic form in FIG. 2.

Figure 2:
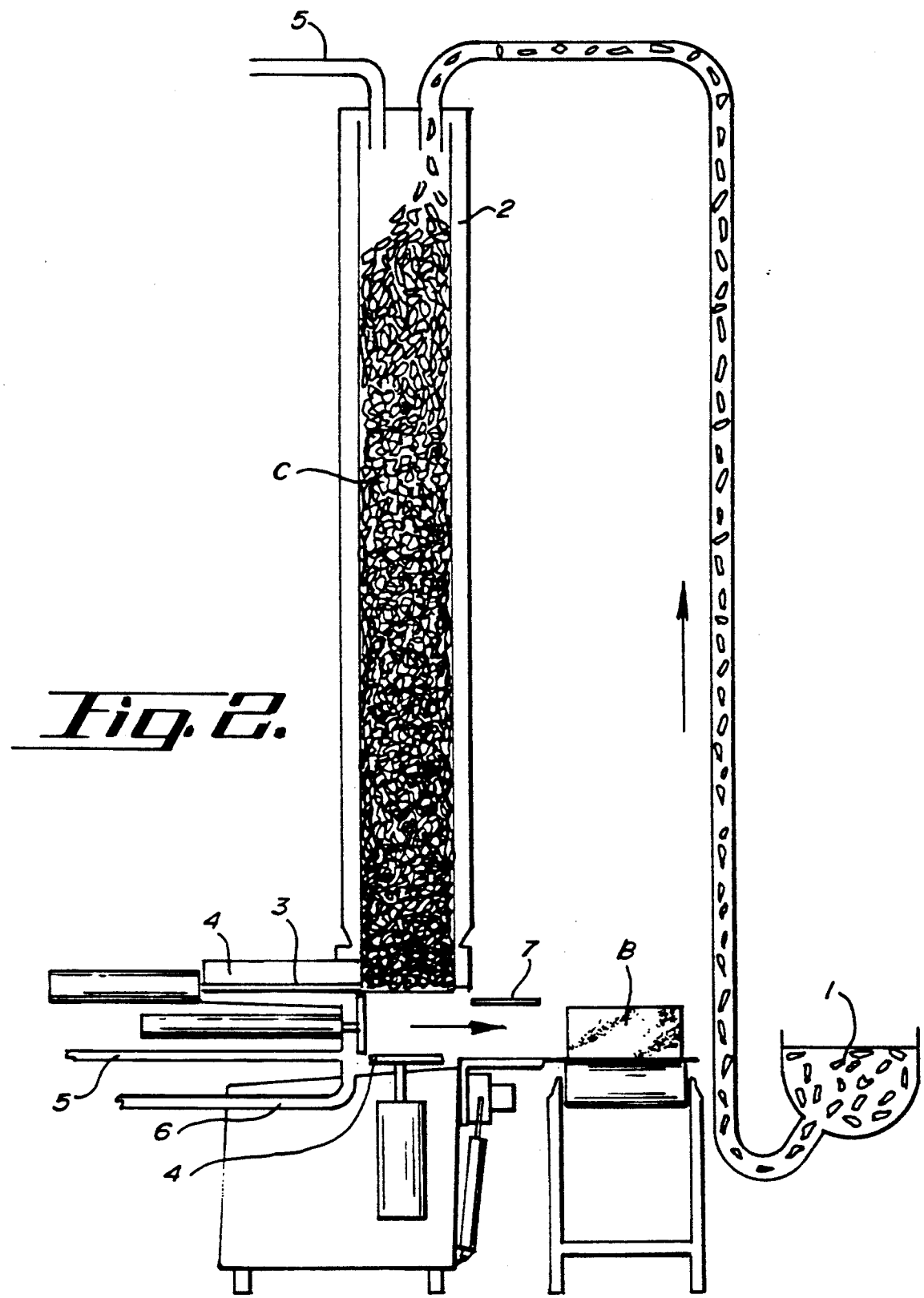
FIG. 2 is a schematic cross section of a cheese forming tower including introduction of curds into the tower, the formation of cheese blocks through the cheese tower where it is conveyed from the tower in substantially rectangular configuration.

As illustrated in the schematic of FIG. 1, in combination with the tower illustrated in FIG. 2, the cheese flow from the continuous cheese making units is into cheese towers where it is progressively compressed, fused, knitted and compacted during tower descent by overlying layers of curd causing elimination of air which is removed through the vacuum lines with additional whey being removed through the lowermost whey drainage port.

FIG. 2 illustrates the progressive compression and incremental density compaction from the curd supply 1 through the tower. A closing guillotine 3 is provided at the lower end of the block forming tower 2 and upon opening thereof a cheese column C of selected cross sectional size will be gravity lowered from the tower 2 onto the elevator 4. The elevator 4 normally is in elevated position against the guillotine 3 and when the guillotine 3 opens the formed cheese column C will descend upon the elevator 4 and when the elevator 4 reaches its pre-selected lower level of travel the guillotine 3 will close against the lower opening of the tower to cut a block of cheese B for continuing process. As illustrated, a vacuum line 5 and whey drain 6 are arranged within this lower level assembly and this entire assembly is normally maintained under vacuum conditions through the door assembly which encloses the same. The whey drain 6 obviously removes the final residual whey from the formed block B and the vacuum line 5 assists in withdrawal of the formed block B from the tower 1 and air in the curd tower 2.

Adjacent the door assembly is, in the form shown, a bag or plastic pouch spreader 7. As illustrated in the schematic of FIG. 1 the bulk blocks B which are within the 40 to 45 pound range may be inspected for initial directing into bulk block packaging for continual handling as block units or the same may be directed to the apportioning flow lines. Such selection and direction depend upon various factors, including consistency of the formed block and market need.

If the selection decision is made that the formed block will remain in its 40 to 45 pound size, it will follow the flow line as illustrated on the left hand side of FIG. 1. In this process or line of flow, the formed block is vacuum packed and is scanned for possible metal inclusions and follows the flow chart through steps of scaling and weight printing and through the following conventional bulk preparation steps of temporary, protective packaging, palletising for convenience, cooling and further handling.

As illustrated in FIG. 1, the primary aspect of the applicant's invention is the direct and immediate handling of the produced blocks exiting the tower to produce and package consumer or cheese market sized portions units while the cheese is in the green state.

Very often the cheese exiting the tower in block form is of substantially rectangular and squared shape and meets consistency considerations and other criteria. If the blocks meet these quality considerations they are not required to go through the pre-squaring trimmer. If however they are of irregular shape the applicant has found that for proper cheese portioning they: should be passed through the pre-squaring trimmer.

Figure 3:
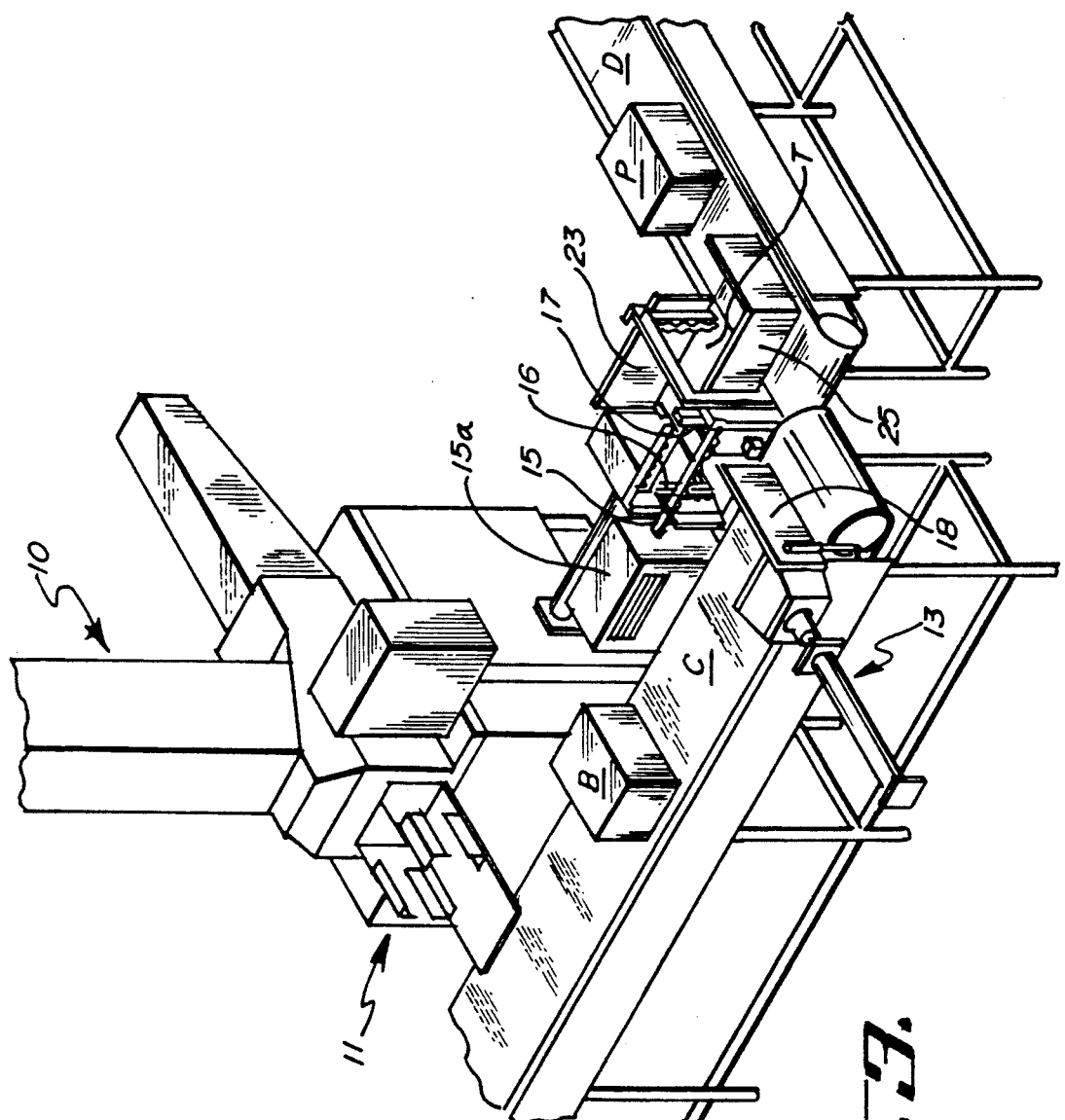
FIG. 3 is a perspective view of a cheese block tower and conveyor operation wherein a formed cheese block is introduced and fed through a first cheese squaring trimmer arrangement
Figure 4:
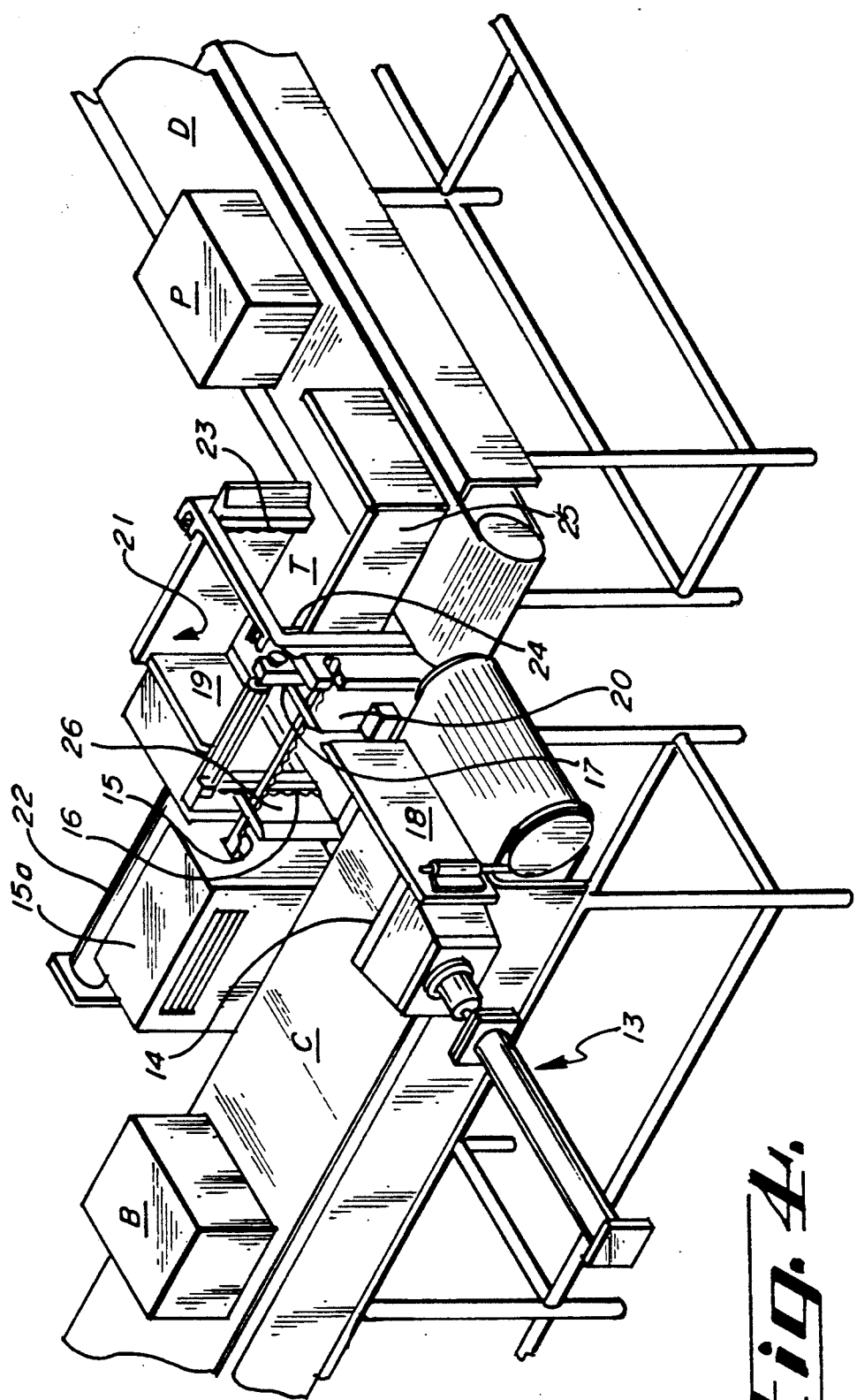
FIG. 4 is an enlarged view of the pre-squaring trimmer as illustrated in FIG. 3.

This pre-squaring trimmer is illustrated in FIGS. 3 and 4 with the only difference in these views being the scale utilized for clarity of illustration. As illustrated in FIG. 3 the cheese tower is designated in its entirety 10 and includes the ejector area 11 with the formed block B being carried by conveyor C to the pre-squaring trimmer station 12. As illustrated in both FIGS. 3 and 4 a first hydraulically or air or other pressurized plunger mechanism 13 is provided to drive the block B transversely from conveyor C onto a shuttle and cutting table T. The plunger mechanism 13 includes a broad face pushing element 14 to contact the end face of the block B to act substantially over the entire end surface thereof to force the block B through a first set of knives which include a horizontally disposed top cutting blade 15 and a pair of reciprocating side blades 16, 17. These blades are operative in a reciprocating fashion through various drive mechanisms and the applicant has found that it is necessary to cut green cheese through the utilization of such reciprocating, self-cleaning, substantially thin, scalloped knife units. To insure proper cutting stroke, applicant has found that it may be necessary to maintain all knives disclosed herein in a spring loaded or tensioned condition.

In cutting aged or ripened cheese it is common to use what are known as harping cutters which are prespaced wire cutters through which the cheese is forced. A harping operation, when utilized on green cheese, does not provide the cut quality surfaces as obtained through the applicant's reciprocating knife units. As illustrated, a drive mechanism 15a is provided for knife 15 and similar drive units are provided for knives 16, 17 below table T. Knife 15 and knives 16, 17 are adjustably spaceable for a first preliminary cut of block B which removes the top surface of the formed block and similarly removes the side surfaces of the block to bring the unit into partially squared consideration. As illustrated, a side guide 18 is positioned adjacent plunger 13 to assist in guiding the block B into the cutting knives 15, 16, 17. Side guide surfaces 19, 20, 26 and an end stop 21 are provided for first alignment of block B. With the utilization of these surfaces, it should be obvious that the block is totally controlled through the cutting operation.

It should also be obvious that the speed and amplitude of the cutting knives is controllable to provide a cut surface of desired quality.

Following this side and top trimming cuts, the block is now arranged against stop 21 and pushing element 19 and a second driven plunger mechanism or drive mechanism 22 is provided to drive the block between a second set of side cutting knives 23, 24. An L-shaped unit designated 25 is provided to receive the cut blocks and guide the same onto portion conveyor D and at this point the block is identified as P, being in portionable size.

At this stage, referring to the schematic of FIG. 1, if the block, after passing through the cheese tower 10 did not satisfy requirements of consistency and desirability it may be recrumbled through the recrumbling unit of FIG. 6 and the reconditioning units of FIGS. 7 and 8 which provide a sizing, humidity and temperature reconditioning such that the curd particles may be passed through a recycling cheese tower.

It should be noted that during this short period the cheese remains in its soft, warm and mellow condition and can be readily recycled and reformed into blocks via a recycling tower without any losses.

Similarly the trimmed cuts that have been made through the operation of knives 15, 16, 17, 23 and 24 in squaring the block same are collectable and recycleable through the recrumbler unit, the conditioning unit and the cheese tower recycler.

Blocks exiting from this cheese tower recycling unit again are selectable for either bulk packaging or proportionate trimming and size trimming through the procedure illustrated on the right hand portion of FIG. 1.

Figure 5:
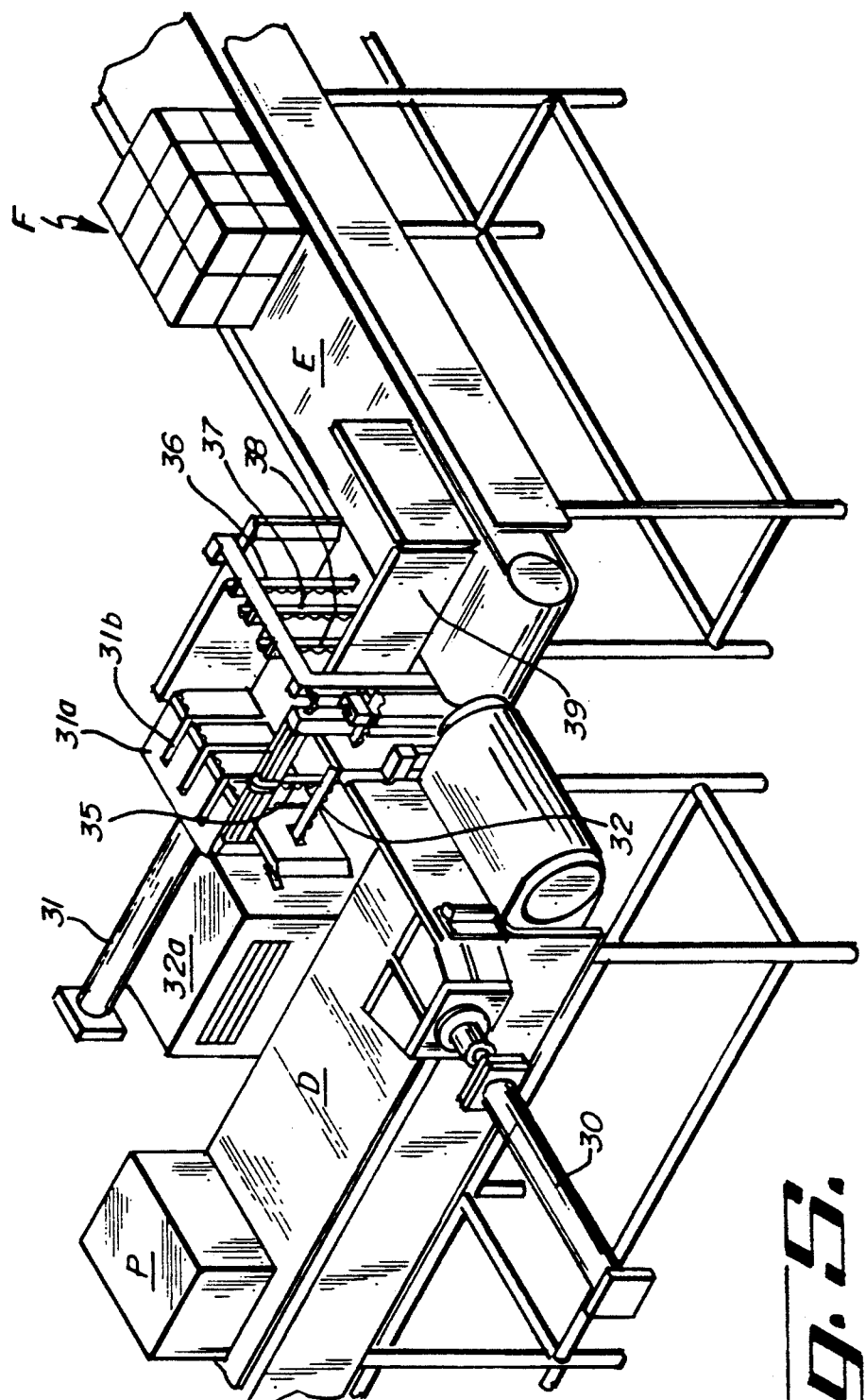
FIG. 5 is a perspective view of a portion cutting unit into which a block of previously squared cheese is introduced and exits therefrom in desired portion configuration.

In continuing the process from FIG. 4 to FIG. 5 and the schematic illustration from the presquaring trimmer to the cheese portion cutter, the now proportionable block P continues on conveyor D to a second set of powering structures designated respectively 30 and 31 through a plurality of knife arrangements to subdivide the block from its presquared shape P into the proportionate and customer size blocks F. This, now totally proportioned block continues on conveyor E for further handling.

As illustrated in FIG. 5, first plunger unit 30 directs the block P through at least a first horizontal cutting blade 32 which will provide a horizontal cut through the entire block. Drive mechanism 32a is provided for knife 32 and the horizontal displacement of this knife 32 is achievable through elevating or lowering the same. In addition to the single knife illustrated, it should be obvious that a plurality of such knives may be driven by drive unit 32a to further reduce the block into more desired form.

A first vertically operative knife 35 is provided to provide a vertical cut approximately through the center of the block P. Such a vertical knife arrangement may include a plurality of knives that are setable along the drive axis thereof to increase the number of cuts dependent upon the desired customer useage. After passing through this first drive device 30 and knife blades 32, 35 the block P unit is arranged parallel to conveyor E and a second power driven mechanism 31 drives the now semi-cut block through a plurality of knives designated 36, 37, 38. An L-shaped stop 39 is provided to stop the now totally cut block and deliver the same along conveyor E. It should be noted that the head 31a of plunger 31 is provided with blade receiving recesses 31b such that this head 31a will completely drive the block through knives 36, 37, 38. In this manner then the entire block exiting tower 10 as B finally exits the presquaring and proportionate cutting devices as the finally proportioned block F.

As illustrated in the schematic flow chart of FIG. 1, after the green cheese has reached its final portion cutting situation F of FIG. 5 the individual blocks are delivered to a packaging machine where they are further scanned against possible metal inclusion. From this metal detection station the individual portion sizes are passed through a check weight scale arrangement for determination of consumer acceptability as to weight of the individual packaging. If the units do not pass weight check situation they are rejected into a reject station which includes stripping of the vacuum plastic covering and are returned to the recrumbling unit and the conditioner and cheese tower for recycling. It is important that the aspect of time be considered. Owing to the immediate handling of the cheese materials that have been provided through the presquaring trimmer, the proportional cutter, initial vacuum package and metal detection unit are still in the fresh, warm, mellow, or green cheese stages. By performing the operation with the desired speed it is possible to recrumble the cheese while the cheese still remains in the green cheese state and to recycle the same through the conditioning mechanism and the recycling cheese tower, without any material losses.

The packaging of the cut portions may be accomplished through a variety of well known systems. Such systems may include vacuum packaging, gas-flush packaging or other hermetic type of packaging arrangements. The aspect of the packaging is to eliminate microbe or other contaminant invasions of the product.

A typical recrumbler is illustrated in FIG. 6. The unit is generally designated 40 and includes an entrance or feed opening 41 into which full blocks or partial trimmed portions of green cheese may be inserted and includes a rotatable member 42 having a plurality of pegs 43 thereon which pass through stationary screening devices 44 for complete crumbling of the cheese blocks or trimmed cheese slices. A screw device 45 advances the now crumbled cheese curd particles to an outlet 46 which directs these recrumbled particles to the conditioning unit as illustrated in FIG. 7.

The conditioner unit is designated in its entirety 50 and illustrates a receiving funnel end 46a to cooperate with the delivery end 46 of the crumbling unit 40. As illustrated a plurality of further crumbling units are provided and are designated 51. All of these members include a plurality of pegs or further crumbling units mounted on rotatably driven axes 52 for agitation and breaking of the curds to recyclable condition.

A partial section of the curd carrying belt of the conditioner 50 is illustrated in FIG. 8 designated 53. As illustrated, the belt 53 includes hinged plate members 65, 66 with each of such plates being provided with a plurality of passages 67 therethrough. The structure allows steam to be introduced into the carried curd particles. The delivery end of conditioner 50 includes a pair of oppositely flighted screw units 55a, 55b which are mounted on a commonly driven axis 56 which direct the reconditioned cheese curd particles into a cheese tower such as that illustrated in FIG. 2.

During reconditioning, it should be noted that a steam and heat line 60 is provided with a plurality of individual nozzle sections 61 underlying and spaced below the flights of conveyor bed 53. The steam, including, obviously, heat introduction, reconditions the curds for introduction into the recycling tower for production of a green cheese block which is processed by the illustration of FIG. 1 and the discussion herein.

As illustrated in the flow chart of FIG. 1, various inspection steps are provided to bring the consumer sized units to final market place conditions. The step of packaging of the consumer sized units from the final block F includes the vacuum pack, gas-flushing pack and other packaging which insures the integrity of the cheese as desired. Uniformity of cooling, curing or aging and ripening of individual consumer or cheese market size units is more readily controllable and insures that such units will not be required to have cheese surfaces re-exposed and thus subjected to external contaminations that may exist in the dual handling of the bulk block cheese.

It should be obvious that the handling system as provided herein substantially reduces loss of product and insures more consistent quality for the cheese produced.

What is claimed is:

1. An apparatus for handling green cheese in its fresh, warm, mellow, curd, particulate state from a cheese making process which forms a mixture of curds and whey before aging, curing and ripening of the green cheese, comprising:
   (a) means for forming blocks of green cheese by removal of the whey from the mixture and compressing the curds; and
   (b) means for initially cutting the blocks of green cheese into portionable blocks.

2. The apparatus of claim 1, further comprising:
   (c) means for portion cutting of the portionable blocks of green cheese into predetermined, consumer market sized portions.

3. The apparatus of claim 2, further comprising:
   (d) means for final packaging of the consumer market sized portions.

4. The apparatus of claim 3, comprising:
   (e) means for cooling the packaged consumer market sized portions.

5. The apparatus of claim 1, wherein the means for forming green cheese block comprises utilizing one of the following apparati selected from the group consisting of a batch cheese making equipment and a cheese tower.

6. The apparatus of claim 2, wherein the means for initially and portion cutting comprises a set of knives.

7. The apparatus of claim 6, wherein each knife is a scalloped blade.

8. The apparatus of claim 6, wherein the knives are reciprocating.

9. The apparatus of claim 6, wherein the knives are self-cleaning.

10. The apparatus of claim 6, wherein the knives are substantially thin.

11. The apparatus of claim 6, wherein the knives are spring loaded and tensioned.

12. The apparatus of claim 2, wherein the means for initially and portion cutting comprises a set of knives, each knife being a substantially thin, reciprocating, scalloped blade.

13. The apparatus of claim 1, further comprising means for recrumbling and reconditioning the green cheese cut from the blocks for addition of the recrumbled and reconditioned green cheese into the mixture of curds and whey.

14. An apparatus for handling green cheese in its fresh, warm, mellow, curd, particulate state from a cheese making process which forms a mixture of curds and whey before aging, curing and ripening of the green cheese, comprising:
   (a) means for forming blocks of green cheese by removal of the whey from the mixture and compressing the curds;
   (b) means for initially cutting the blocks of green cheese into pre-squared portionable blocks; and
   (c) means for portion cutting of the portionable blocks of green cheese into predetermined, consumer market sized portions.

15. The apparatus of claim 14, further comprising:
   (d) means for final packaging of the consumer market sized portions.

16. The apparatus of claim 15, further comprising:
   (e) means for cooling the packaged consumer market sized portions.

17. The apparatus of claim 14, wherein the means for forming green cheese block comprises utilizing one of the following apparati selected from a group consisting of a batch cheese making equipment and a cheese tower.

18. The apparatus of claim 14, wherein the means for initially and portion cutting comprises a set of knives.

19. The apparatus of claim 18, wherein each knife is a scalloped blade.

20. The apparatus of claim 18, wherein the knives are reciprocating.

21. The apparatus of claim 18, wherein the knives are self-cleaning.

22. The apparatus of claim 18, wherein the knives are substantially thin.

23. The apparatus of claim 14, further comprising means for recrumbling and reconditioning the green cheese cut from the blocks for addition of the recrumbled and reconditioned green cheese into the mixture of curds and whey.

24. An apparatus for handling green cheese in its fresh, warm, mellow, curd, particulate state from a cheese making process which forms a mixture of curds and whey before aging, curing and ripening of the green cheese, comprising:
   (a) means for forming blocks of green cheese by removal of the whey from the mixture and compressing the curds; and
   (b) means for cutting the blocks of green cheese into portionable blocks comprised of a set of knives, each knife being a substantially thin, reciprocating, scalloped blade.

25. The apparatus of claim 24, further comprising:

(c) means for portion cutting of the portionable blocks of green cheese into predetermined consumer market sized portions.

26. The apparatus of claim 25, further comprising:
(d) means for final packaging of the consumer market sized portions.

27. The apparatus of claim 26, further comprising:
(e) means for cooling the packaged consumer market sized portions.

28. The apparatus of claim 24, further comprising:
(f) means for recrumbling and reconditioning the green cheese cut from the blocks for addition of the recrumbled and reconditioned green cheese into the mixture of curds and whey.

29. The apparatus of claim 24, wherein the means for forming green cheese block comprises utilizing one of the following apparati selected from a group consisting of a batch cheese making equipment and a cheese tower.

30. An apparatus for handling green cheese in its fresh, warm, mellow, curd, particulate state from a cheese making process which forms a mixture of curds and whey before aging, curing and ripening of the green cheese, comprising:
(a) means for forming blocks of green cheese by removal of the whey from the mixture and compressing the curds;
(b) means for initially cutting the blocks of green cheese into portionable blocks;
(c) means for portion cutting of the portionable blocks of green cheese into predetermined consumer market sized portions;
(d) means for final packaging of the consumer market sized portions; and
(e) means for cooling the packaged consumer market sized portions prior to aging, curing and ripening of the green cheese.

31. The apparatus of claim 30, wherein the means for forming green cheese block comprises utilizing one of the following apparati selected from a group consisting of a batch cheese making equipment and a cheese tower.

32. The apparatus of claim 30, wherein means for initially and portion cutting comprises a set of knives.

33. The apparatus of claim 32, wherein each knife is a scalloped blade.

34. The apparatus of claim 32, wherein the knives are reciprocating.

35. The apparatus of claim 32, wherein the knives are self-cleaning.

36. The apparatus of claim 32, wherein the knives are substantially thin.

37. The apparatus of claim 32, wherein the knives are spring loaded and tensioned.

38. The apparatus of claim 30 wherein the means for initially and portion cutting comprises a set of knives, each knife being a substantially thin, reciprocating, scalloped blade.

39. The apparatus of claim 30, further comprising means for recrumbling and reconditioning the cut green cheese addition of the recrumbled and reconditioned green cheese into the mixture of curds and whey.

40. An apparatus for handling green cheese in its fresh, warm, mellow, curd, particulate state from a cheese making process which forms a mixture of curds and whey before aging, curing and ripening of the green cheese, comprising:
(a) means for forming blocks of green cheese by removal of the whey from the mixture and compressing the curds;
(b) means for initially cutting the blocks of green cheese into portionable blocks;
(c) means for portion cutting of the portionable blocks of green cheese into predetermined consumer market sized portions, the means for initially and portion cutting comprises a set of knives, each knife being a substantially thin, reciprocating, scalloped blade;
(d) means for final packaging of the consumer market sized portions;
(e) means for cooling the packaged consumer market sized portions; and
(f) means for recrumbling and reconditioning the green cheese cut from the blocks and the portionable configurations for addition of the recrumbled and reconditioned green cheese into the mixture of curds and whey.

41. A method for handling green cheese in its fresh, warm, mellow, curd, particulate state from a cheese making process which forms a mixture of curds and whey before aging, curing and ripening of the green cheese, comprising the following steps:
(a) forming blocks of green cheese by removal of the whey from the mixture and compressing the curds;
(b) initially cutting the blocks of green cheese into portionable blocks;
(c) further portion cutting of the portionable blocks of green cheese into predetermined consumer market sized portions;
(d) packaging of the consumer sized portions for the market; and
(e) cooling the packaged consumer market sized portions.

42. The apparatus of claim 41, further comprising:
(f) collecting the green cheese cut away from the blocks and portionable blocks of green cheese.

43. The apparatus of claim 42, further comprising:
(g) recrumbling and reconditioning the collected green cheese.

44. The apparatus of claim 43, further comprising: adding the recrumbled and reconditioned green cheese to the mixture of curds and whey.

* * * * *

UNITED STATES PATENT AND TRADEMARK OFFICE
CERTIFICATE OF CORRECTION

PATENT NO. : 5,324,529

DATED : June 28, 1994

INVENTOR(S) : Ian P. Brockwell

It is certified that error appears in the above-identified patent and that said Letters Patent is hereby corrected as shown below:

In the Title, please delete the word "and" and replace with --an--.

In column 1, line 34, please delete "dling, in" and replace with --dling. In--.

In column 3, line 45, after the words "U.S. Pat.", please delete the word "No.".

In column 3, line 68, at the end of the line after the word "tower", please insert the numeral --2--.

In column 4, line 40, after the word "they", please delete the colon.

In column 7, line 62, after the words "selected from", please delete the word "the" and replace with --a--.

Signed and Sealed this

Twenty-seventh Day of September, 1994

Attest:

BRUCE LEHMAN

Attesting Officer        Commissioner of Patents and Trademarks